March 31, 1953 L. A. B. CABES 2,633,557

SIGNAL RECEIVER FOR DISCRIMINATING SIGNALS

Filed July 31, 1947

Inventor
LUCIEN ALFRED BENOIT CABES

By

R. P. Morris

ATTORNEY

Patented Mar. 31, 1953

2,633,557

UNITED STATES PATENT OFFICE 2,633,557

SIGNAL RECEIVER FOR DISCRIMINATING SIGNALS

Lucien Alfred Benoit Cabes, Antwerp, Belgium, assignor to International Standard Electric Corporation, New York, N. Y., a corporation of Delaware Application July 31, 1947, Serial No. 765,021
In the Netherlands May 7, 1943

Section 1, Public Law 690, August 8, 1946
Patent expires May 7, 1963

4 Claims. (Cl. 315—165)

Figure 1:
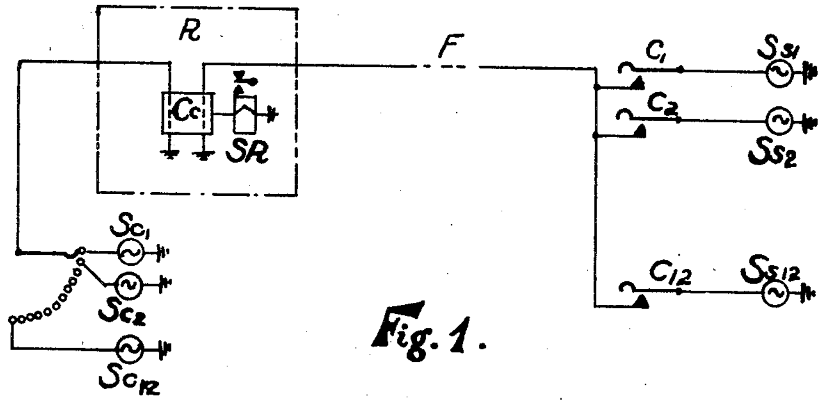

This invention relates to improvements in the A. C. voltage comparing circuits of A. C. signal receivers used in systems controlled by such signals. More particularly, it relates to such improvements for A. C. signal receivers of the type in which a selected one of a number of A. C. signaling potentials, each of which differs from the others in at least one of its electrical characteristics (such as its frequency, potential or phase), is applied as a control voltage to one input of a signal receiver which thereafter will respond only when an A. C. reference potential, all of whose electrical characteristics are in a predetermined relationship to those of the signaling potential, e. g. are identical thereto, is simultaneously connected to another input of the signaling receiver.

Such signal receivers are known to the prior art as is shown in U. S. Patent 2,424,585, issued on July 29, 1947, to a subsidiary of the assignee herein. Such signal receivers may be used in a variety of so-called multi-potential control systems, for example in a multi-potential register controller for a telephone exchange. In such a system a register controller is first set by dialed impulses representing a called station, i. e. the impulses set a number of automatic switches, such as step-by-step switches, so that each one picks out and stores a distinctive potential corresponding to a digit of the called number. The register controller applies each of these potentials as a control signal to one side of a signal repeater. For each automatic switch of the register a particular idle selector switch is set into motion and as it hunts one of its brushes successively applies to the other side of the signal repeater test potentials which mark its different contact banks. When the selector reaches a test potential corresponding to the control signal the receiver will respond, and in so doing it will act to stop the selector. The potentials referred to as control signals and the test potentials, in the above comments as to multi-potential register controllers, correspond to potentials which will be referred to respectively as A. C. signaling potentials and A. C. reference potentials for describing the present invention According to the invention resultant A. C. potentials are produced at all times when the A. C. signaling and reference potentials which are applied to separate inputs of the signal repeater do not have a particular predetermined relationship for causing the signal receiver to respond, i. e. are not identical in all their characteristics. These resultant A. C. potentials are applied to a first gaseous discharge tube of the signal receiver to maintain ionization thereof. As a result, this gas tube will continuously draw direct current pulses. These pass through a resistance which has a high value and is shunted by a condenser of small capacity thereby keeping the condenser charged to a negative potential which is applied as a blocking bias to the control electrode of a second gaseous discharge tube. Thus the second tube never fires when the two input A. C. potentials are not identical. On the other hand, when identical A. C. signaling and reference potentials are applied to the signal receiver there is no resultant A. C. potential. Because of this, the first tube is quenched and it stops the supply of current to said resistance. The condenser thereupon discharges (through the resistance) causing the negative potential at the control electrode at the second tube to drop to a value where that tube will fire spontaneously. It is the firing of the second tube which operates a signaling device or performs a control function, this occurring only when the signal receiver receives identical signaling and reference potential.

According to another characteristic of a specific embodiment of the invention, the signal receiver contains two transformers to the respective primary windings of which the sources of A. C. signaling and reference potentials may be respectively connected. Each transformer has two secondary windings each of which is so connected in series with a secondary winding of the other transformer that when the signaling and reference potentials are alike in magnitude, polarity and phase the resultant potentials at the extremities of each series-connected pair of secondary windings will be of zero or negligible value.

It is an object of the invention to improve known signal receivers of the type referred to above. It is a further object of this invention to improve on the signal receiver described in the above mentioned U. S. patent in the following respects:

(A) To eliminate an amplifier tube. In certain telecommunication systems the A. C. signaling and reference potentials must have low values so as to avoid interference between adjacent circuits. Moreover, the arrangement of a cold cathode gaseous discharge tube with a dry rectifier bridge, which has been used in the signal receiver for exercising the control function, required a rather large amount of energy from the sources providing the signaling and reference potentials (due to voltage drops and energy losses in the rectifier bridge and its associated load resistance). Therefore, an amplifier was necessary. This was very inconvenient as it required a constant filament current so long as the signal receiver remained in a standby condition ready for use. Moreover, since certain types of amplifier tubes require considerable heating time to bring them to operating condition, it is not even practical to arrange the circuit so that the filament current will be connected only during periods when the signal receiver is actually in use, it being impractical since such an arrangement will have to meet the very difficult requirement of anticipating each occasion when the receiver is to come into use in order to turn on the filament current supply sometime in advance.

It is, therefore, advantageous to have a signal receiver which responds to low potential signals without requiring the use of a thermionic tube.

(B) To permit the use of a simplified transformer. The known signal receiver contained a transformer of the balanced symmetrical coil type. The amount of precision required in the manufacture of this type of coil is considerable owing to which its price tends to be rather high. It is, therefore, desirable to devise a signal receiver in which a simpler type of transformer can be used.

(C) To eliminate false operation. Besides being costly the operation of the amplifier tube has been unreliable. On random occasions the tube may be overloaded by current surges in either of its input circuits so that irrespective of the relative characteristics of the signaling and reference potentials it is unable to pass any alternating current. Accordingly, at times it will respond unduly.

Figure 2:
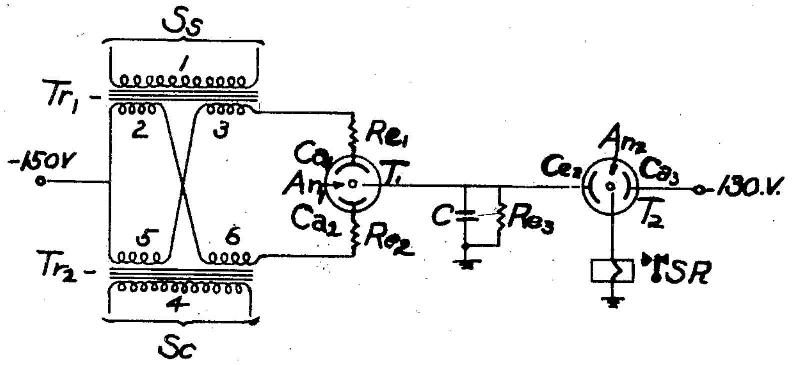

Other objects, features and advantages of this invention will be apparent from the following detailed description of a preferred embodiment and from the drawing, in which:

Fig. 1 represents a simple arrangement for using a potentials-comparing signal receiver; and Fig. 2 shows a circuit diagram of an improved signal receiver according to the present invention.

The arrangement of Fig. 1 illustrates known principles relating to the use of a potentials comparing signal receiver. It shows a signaling wire *f* into one end of which any one of a number of different signaling potentials may be fed by actuating an appropriate one of a group of signaling contacts $C_1$, $C_2$ . . . $C_{12}$. As a result this potential will reach a signal receiver R, which is connected to the other end of wire *f*. Each of the signaling contacts $C_1$ . . . $C_{12}$ is connected to one of a number of different sources of A. C. signaling potentials $Ss_1$, $Ss_2$ . . . $Ss_{12}$ whose output potentials are distinguished from one another in at least one of their electrical characteristics (potential, frequency or phase). While this example shows a group of individually operable contacts it is obvious that they may be replaced by a single automatic switch, such as a stepping switch, having a bank of contacts which are individually connected to the sources $Ss_1$, $Ss_2$ . . . $Ss_{12}$ and a wiper for the contacts which is connected to the input end of wire *f*.

The signal receiver contains a discriminating or comparing device Cc to one side of which the signaling wire *f* is connected while to its other side there is connected a means for successively applying a plurality of different A. C. reference potentials to the receiver, e. g. by the aid of a selector switch having a bank of contacts individually connected to a number of sources of reference potentials, sources $Sc_1$, $Sc_2$ . . . $Sc_{12}$.

The reference potentials are also distinguished from each other in at least one of their characteristics, but each of them corresponds in all of its characteristics to the signaling potential provided by one of the sources $Ss_1$ . . . $Ss_{12}$.

The purpose of the discriminating device Cc is to compare the electrical characteristics of any two A. C. potentials which are respectively connected to its two inputs at the same time and to respond in an appropriate manner, if they correspond in all of their electrical characteristics, for energizing a relay SR which may perform any desired useful function, such as stopping the hunting of the switch over which the reference potentials are applied or operating a signaling device. To one skilled in the art it is either already known or it will be apparent how an arrangement corresponding generally to that of Fig. 1 may have a wide variety of uses, such as operating teleprinters, controlling automatic selector switches, controlling automatic elevators, etc.

It will be evident that the signaling and reference potentials may be derived from a single set of sources, i. e. that the sources $Ss_1$ . . . $Ss_{12}$ and the sources $Sc_1$ . . . $Sc_{12}$ are one and the same. However, it may not be economical to use a single set of sources if the distance between the locations of the group of signaling contacts $C_1$ . . . $C_{12}$ and the switch shown in Fig. 1 is so great that the cost of installing long conductors will exceed the cost of duplicating the sources.

In one embodiment, use is made of potentials of equal frequency and magnitude but having phase angles which are different multiples of 30°. The minimum of 30° phase difference which this affords between any two potentials is large enough to assure dependable operation of the signal receiver and is small enough to afford twelve distinct signaling potentials (and twelve corresponding reference potentials). This number can easily be increased by employing a second set of twelve potentials also of equal frequency and magnitude and also having phase angles which are different multiples of 30° (phase angles which differ by at least 30°) but which differ from the first set of twelve potentials in their magnitude, for example the first set may have a potential of 2 volts and the second set may have a potential of 3 volts. Other ways of obtaining an even further increased number of different signal and reference potentials will be obvious to the expert from the foregoing.

The operation of the signal receiver will now be described with reference to Fig. 2.

Signaling and reference potentials are respectively applied to the signal receiver across the primary winding 1 of transformer $Tr_1$ and the primary winding 4 of transformer $Tr_2$. Each of these two transformers has two secondaries, 2, 3, and 5, 6, each of which is so interconnected in series with one of the secondary windings of the other that when the same A. C. potentials (or exactly corresponding A. C. potentials) are respectively connected to primaries 1 and 4 the potential induced in each secondary winding will be opposite in polarity to that induced in the winding with which it is connected in series. Moreover, the relationships between the turns-ratios of each secondary to its primary will be such that these potentials of opposite polarity will cancel each other, i. e. that the total A. C.

potential across each pair of series-connected secondaries will be zero or very nearly so.

In the manner shown in Fig. 2 one end of the series circuit comprising secondaries 2 and 6, as well as the corresponding end of the series circuit comprising windings 5 and 3, is connected to a source of negative direct potential, designated by the legend −150 v., whose positive terminal (not shown) may be considered to be grounded.

The other ends of these series circuits are respectively connected to the cathodes $Ca_2$ and $Ca_1$ of a gaseous discharge tube $T_1$ of the cold cathode type, the connections being respectively over resistors $Re_2$ and $Re_1$. From the foregoing it is apparent that when identical sources of A. C. potentials are connected to the primary windings 1 and 4 there will be no A. C. potential difference between the two cathodes though each of them will be at a D. C. level below ground (150 volts below ground, asuming that tube $T_1$ is not ionized).

If secondary windings 2 and 5 are so wound that the feeding of A. C. potentials of the same phase to primaries 1 and 4 will induce A. C. voltages which have the same phase as to each other when they are measured at corresponding ends of those windings, e. g. at the ends thereof which are respectively connected to windings 6 and 3, and if, in addition, all of the other above-described requirements for transformers $Tr_1$ and $Tr_2$ are met, the over-all result will be that when unlike A. C. potentials are respectively applied to primaries 1 and 4 then the A. C. outputs which will be respectively impressed on cathodes $Ca_1$ and $Ca_2$ by the two series circuits will be of opposite polarities. The ratio of the number of turns between each primary winding and its associated two secondary windings should be so high that the potential difference which thus arises between the two cathodes $Ca_1$ and $Ca_2$, even where the input A. C. potentials have the minimum phase difference of 30°, will be sufficient to ionize the gas in the discharge gap between these two cathodes. The circuit is arranged so that under these conditions the gas tube will also draw current over its anode $An_1$, via grounded anode resistor $Re_3$, and will thereby produce and maintain across this resistor a negative voltage for blocking a second gas tube $T_2$, and so that, if these conditions cease to exist, i. e. if the identical signal and reference voltages are applied to the receiver, the ensuing quenching of the gap between the cathodes will act to arrest the flow of anode current with the result that the second tube will soon cease to be blocked.

Tube $T_1$ is so selected that if it is extinguished to begin with, the 150 volt potential difference between each of the cathodes and the anode will be insufficient to break it down. As soon as there is a resultant A. C. potential of sufficient magnitude to initiate a discharge between the two cathodes discharge current will begin to flow from anode $An_1$ toward the source of D. C. potential, −150 v., that flow in any particular instant occurring over one or the other of the cathodes, and, possibly at some instance, over both of them. One explanation for this anode discharge current flow is that the same A. C. potential which ionizes the gap between the two cathodes also affects the respective magnitudes of the two anode-to-cathode potentials. During a half cycle when the A. C. potential developed across the series circuit of winding 5, 3 is negative, so that the cathode $Ca_1$ becomes more negative than −150 volts (during which one half cycle, of course, cathode $Ca_2$ will become less negative than −150 volts) the total potential difference between the anode and the cathode $Ca_1$ may of itself be enough to ionize the gap between them and to cause current to flow from $An_1$ to $Ca_1$. And if this is so, then during the next half cycle, when $Ca_2$ will be more negative, anode current will flow to this cathode and the over-all result will be that a pulsating direct current will flow upward from ground through resistor $Re_3$.

Another explanation is that once the gas between the cathodes is ionized, less of a D. C. potential difference will be required to cause a discharge between the anode and either of the cathodes. Accordingly, at the same time that alternating current circulates back and forth around the closed loop including the four secondary windings and the discharge gap between the cathodes, direct currents (or direct currents with D. C. pulse ripple components) will be flowing from the anode toward the source of direct potential through the two series circuits 5, 3 and 2, 6 which are in parallel to each other as to these direct currents. $Re_3$ has a very high resistance value as compared to the internal impedance of either anode-to-cathode discharge path of tube $T_1$; to values of the resistors $Re_1$ and $Re_2$; and to the resistive component of the series circuits 5, 3 and 2, 6. As a result the potential which will be developed across condenser C will be a large part of the −150 volts provided by the source of direct potential. Since the charge in condenser C will reduce each anode-to-cathode potential difference, the anode-to-cathode discharge over at least one of the cathodes, and possibly occasionally over both of them, may be interrupted from time to time for very short periods while C discharges slightly through $Re_3$. However, since only a small voltage difference is needed to start and to maintain ionization between the anode and a cathode during a time when the gap between the cathodes is separately ionized, these interruptions will be only momentary and the average flow of anode current will be sufficient to produce and to maintain a very substantial negative voltage across condenser C. On the other hand, if the gap between the cathode is de-ionized, the small difference remaining across the gap from the anode to either cathode, due to the large charge on condenser C, will not be adequate to sustain ionization and, therefore, tube $T_1$ will become quenched completely. Moreover, once this has occurred it will remain quenched even after the negative charge bleeds off condenser C through resistor $Re_3$, i. e. the tube will not be reignited unless ionization is started between its cathodes.

Once a large A. C. potential fires the gap between the two cathodes the tube will thereafter tend to draw across that gap any amount of current that might be necessary to reduce that potential to a lower value which is characteristic of the tube in its ionized condition, i. e. to reduce it from a "firing potential" of say 110 volts to a "sustaining potential" of say 60 volts. In order to limit the current which the tube must draw to produce the necessary 50 volt drop, two voltage dropping resistors $Re_1$ and $Re_2$ are included respectively in series between the series circuits 5, 3 and 2, 6 and the two cathodes $Ca_1$ and $Ca_2$. These resistors may be of equal value so that the voltage drop will be divided equally between them. As a result at a particular instant the negative potential of one of the cathodes will be increased by 30 volts (the peak value of an A. C. component will be added to its D. C. voltage) and that of the other will be decreased by a like amount so that their respective instantaneous potentials will be −180 and −120 volts with respect to ground. Assuming (in accordance with the first of the two explanations offered above) that at that instant the current flow from anode $An_1$ is only to the more negative of the two cathodes, the instantaneous anode potential, while anode current is flowing, will be a function of: (1) the value of the dropping resistor ($Re_1$ or $Re_2$) which is in series with the cathode over which the current flow is taking place, (2) the sustaining potential in the discharge gap between the anode and that cathode, and (3) the value of resistance $Re_3$.

However, while resistors $Re_1$ and $Re_2$ may give rise to substantial A. C. voltage drops because their values are high with respect to the impedance of the gap between the cathode of tube $T_1$, they do not occasion substantial D. C. drops because their values are low with respect to the value of $Re_3$. Hence even where anode current is flowing any D. C. drops between the source of direct potential and the cathodes will be of negligible magnitudes and therefore the instantaneous potential between each cathode and ground may still be considered to be the entire −150 volts of direct potential algebraically added to an A. C. component.

Accordingly, for the example under consideration, the instantaneous potential difference between the anode and ground will be very nearly the value derived by subtracting the last-mentioned ionization sustaining voltage from the whole −180 volt potential difference between the more negative one of the two cathodes and ground. If the sustaining voltage will be assumed to be 75 volts it follows that the instantaneous potential will be about −115 volts, this being, of course, the peak potential for the anode. Condenser C will smooth out the D. C. pulse component of the anode current and it will be charged to a value near to the above-mentioned peak value, −115 volts. The time constant of condenser C and resistor $Re_3$ is chosen so that the potential across the condenser will drop only slightly between successive moments of peak potential.

There is provided a second cold cathode tube $T_2$ which also has two cathodes, one of which, cathode $Ce_2$, is connected to anode $An_1$ of tube $T_1$. From the foregoing it is apparent that so long as there are resultant A. C. outputs from transformers $Tr_1$ and $Tr_2$ cathode $Ce_2$ will be maintained at a potential level of −115 volts. The circuit of tube $T_2$ is so arranged that under these conditions it will remain totally quenched. To this end the other cathode of tube $T_2$, i. e. its cathode $Ce_3$ which opposes cathode $Ce_2$ to form a control gap, is connected to a source of negative direct potential of more than 115 volts magnitude whereby the greater the charge on condenser C the smaller the potential difference between the cathodes of tube $T_2$. Since this potential only slightly exceeds −115 volts, when condenser C is charged, in the manner explained above, the potential difference across the gap formed by the cathodes of tube $T_2$ is very small and, of course, is insufficient to ionize the tube. On the other hand, since the firing potential for the control gap of $T_2$ is less than 115 volts, this gap will be fired if condenser C is discharged.

The following is an operating cycle of the signal receiver which takes place when the A. C.

signaling and reference potentials which it receives on its two inputs are identical in all their electrical characteristics. A resultant A. C. potential difference will cease to be maintained between the cathodes $Cc_1$ and $Cc_2$. This will quench the control gap and, therefore, the entire tube $T_1$. Condenser C will discharge through resistor $Re_3$ so that the potential level of anode $An_1$ of tube $T_1$ (and of cathode $Ce_2$ of tube $T_2$) will diminish from a value of the order of −115 volts toward the zero volts potential level of ground (the time constant of C and $Re_3$ is sufficiently long to permit the tube $T_1$ to be completely de-ionized, after its control gap is quenched, before any substantial decrease occurs in the potential across the condenser so as to avoid reestablishment of any anode to cathode discharge not initiated at the control gap); when the potential difference between cathodes $Ce_2$ and $Ce_3$ of tube $T_2$ attains a predetermined value the control gap of $T_2$ will ionize; this will lead to anode discharge for tube $T_2$; and since the ground return for anode $An_2$ is over the magnetizing coil of a signaling relay SR that relay will be actuated.

The time which elapses between the moment when identical signaling and reference potentials are applied to the receiver and the moment when the processes of extinguishing tube $T_1$ and ionizing tube $T_2$ are completed depends largely on the values of the different components used in the circuit. By a suitable choice of these components it is possible to attain very quick operation of the signaling relay. For example, in an embodiment using A. C. signaling and reference potentials having a frequency of 450 cycles per second it was found possible to operate this relay within .8 to 1.5 a. s. after the moment when identical potentials were applied.

It will be evident that the above mentioned disadvantages inherent in previous signal receivers of this kind are eliminated in an approved receiver according to this invention.

It should be clear that the invention is not limited to the particular embodiment shown in Fig. 2 but that a number of variations thereof are possible.

For example, instead of using one three-element cold cathode tube for $T_1$, it is possible to use two two-element tubes or even a single two-element tube if it will be satisfactory for anode current of $T_1$ to flow only for one half of each cycle of the resultant A. C. potential.

Further, instead of using two transformers of the kind indicated in Fig. 2 herein, it would be possible to use transformers such as are described in the above-mentioned U. S. patent, and instead of using cold cathode gas discharge tubes, it would be possible to use gas tubes having hot cathodes and control grids, i. e. tubes which are known commercially as thyratrons

I claim:

1. An A. C. potentials-comparing signal receiver comprising a transformer means having a first input for receiving a selected one of a plurality of different A. C. signaling potentials and a second input for receiving one at a time a plurality of A. C. reference potentials each of which differs from all the others in at least one of its characteristics but is identical to one of the signaling potentials in frequency, magnitude and phase, the transformer means including two primaries fed from said two inputs and one secondary inductively coupled to one primary connected in series with one that is coupled to the other, the directions of the windings of the primaries and secondaries and their turns ratios being selected so that no significant resultant A. C. potential will appear across the series circuit formed by the series-connected secondaries when the input signaling and reference potentials are identical and so that substantial resultant potentials of opposite polarity will appear across it when the input potentials are not identical, a condenser and a resistor connected in parallel, a gaseous discharge tube responsive to a resultant A. C. potential to translate it into a D. C. control potential across said parallel connected condenser and resistor, the gas discharge tube having two electrodes forming a control gap, each of the electrodes being connected to one end of said series circuit to ionize said control gap upon an unbalance of voltage applied to the respective electrodes, a source of direct potential, the series circuit being connected to one terminal of the source, a third electrode for the tube connected to the other terminal of said source over said resistor and condenser, and another gaseous discharge tube which is selectively responsive to the said control potential developed across said condenser and resistor.

2. An A. C. potentials-comparing signaling receiver comprising a transformer means having a first input for receiving a selected one of a plurality of different A. C. signaling potentials and a second input for receiving one at a time a plurality of A. C. reference potentials each of which differs from all the others in at least one of its characteristics but is identical to one of the signaling potentials in frequency, magnitude and phase, the transformer means including two primaries fed from said two inputs and two secondaries inductively coupled to each primary with each secondary which is coupled to one primary connected in series with one that is coupled to the other, the directions of the windings of the primaries and secondaries and their turns ratios being selected so that no significant resultant A. C. potential will appear across the respective series connected pair of secondaries when the input signaling and reference potentials are identical and so that substantial resultant potentials of opposite polarity will appear across them when the input potentials are not identical, a condenser and a resistor connected in parallel, a gaseous discharge tube responsive to a resultant A. C. potential to produce a D. C. control potential across said parallel connected condenser and resistor, the gas discharge tube having two electrodes forming a control gap, each of the electrodes being connected to one end of the series circuit formed by one of the series-connected pair of secondaries, a source of direct potential, the other ends of the two series circuits being connected to one terminal of the source, a third electrode for the tube connected to the other terminal of said source over said resistor and condenser, and another gaseous discharge tube which is selectively responsive to the said control potential developed across said condenser and resistor.

3. A signal receiver as in claim 2, in which the connection of each of the electrodes to one end of the series circuit formed by one of the series-connected pair of secondaries is over a voltage dropping resistor for limiting the magnitude of the A. C. discharge current across the control gap, and each of the voltage dropping resistances has a value which is very small as compared to the value of the first-mentioned resistor.

4. An alternating current signaling device comprising transformer means having a first input for having applied thereacross a selected one of a plurality of different alternating current signaling potentials and a second input for having applied thereacross in succession a plurality of alternating current reference potentials each of which differs from all the others in at least one of its characteristics but is identical to one of the signaling potentials in frequency, magnitude and phase, the transformer means including two primaries fed from said two inputs and two secondaries inductively coupled to each primary, a source of direct current potential having a pair of terminals, two of said secondaries being connected at one end to a common direct potential source terminal, the other ends of said two secondaries being connected in series with one end of the other secondary coupled to a different one of said primaries, a condenser and a resistor connected in parallel, a gaseous discharge tube coupled responsive to a resultant alternating current potential to produce a direct current control potential across said parallel connected condenser and resistor, the gaseous discharge tube having two electrodes forming a control gap, each of the electrodes being connected to the respective other secondaries, the direction of the windings of the primary and secondary windings and the turn ratios thereof being selected so that no significant alternating current potential will appear across the ends of the series connected secondaries which are connected to said control electrodes when the input signal and reference potentials are identical and so that substantial resultant potentials of opposite polarity will appear across the electrodes when the input potentials are not identical, a third electrode for the tube and means for connecting said parallel resistor-condenser circuit to said third electrode and the other terminal of said source.

LUCIEN ALFRED BENOIT CABES.

REFERENCES CITED

The following references are of record in the file of this patent:

UNITED STATES PATENTS

| Number | Name | Date |
|---|---|---|
| Re. 22,861 | Deakin | Apr. 8, 1947 |
| 2,424,585 | Simon | July 29, 1947 |